H. H. MERCER.
VALVE CONTROLLING MECHANISM.
APPLICATION FILED FEB. 23, 1916.
1,355,768.
Patented Oct. 12, 1920.
3 SHEETS—SHEET 3.
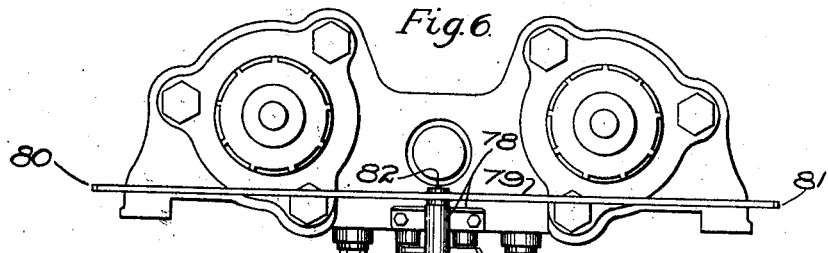
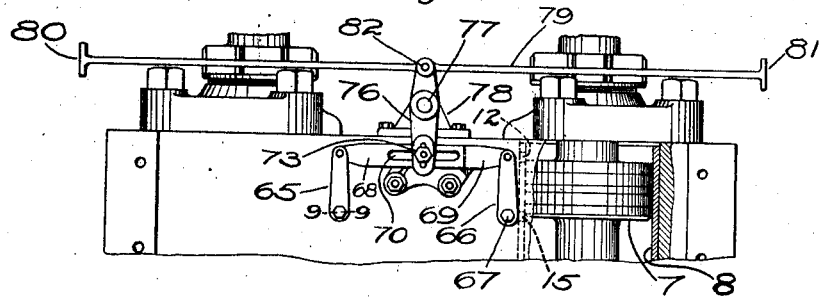
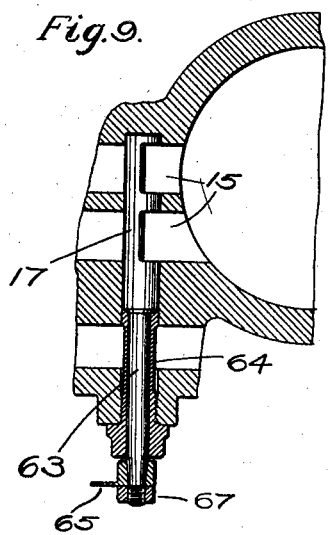
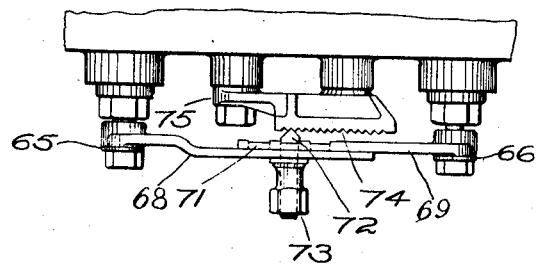
Inventor
Henry H. Mercer
By Horace L. [illegible]
Atty.

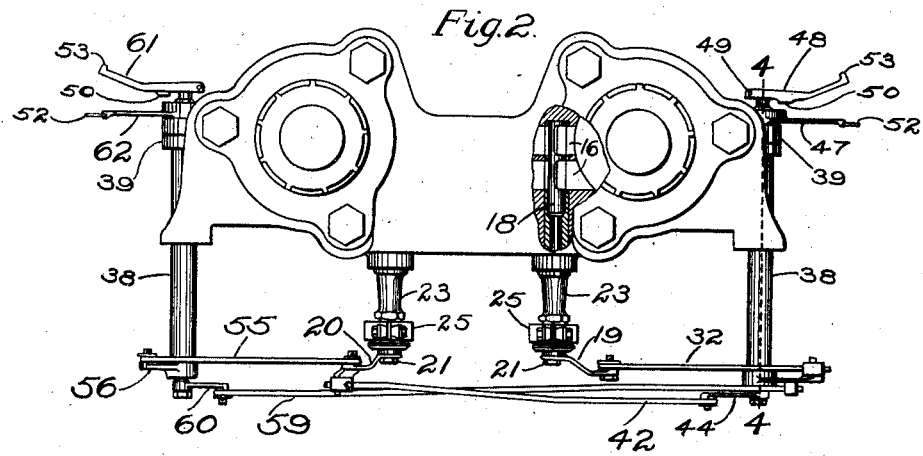
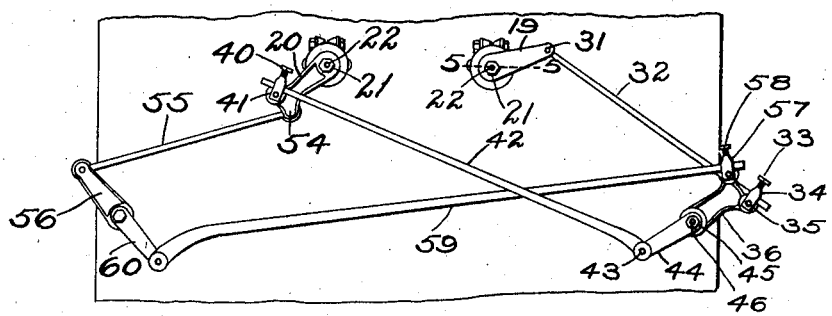
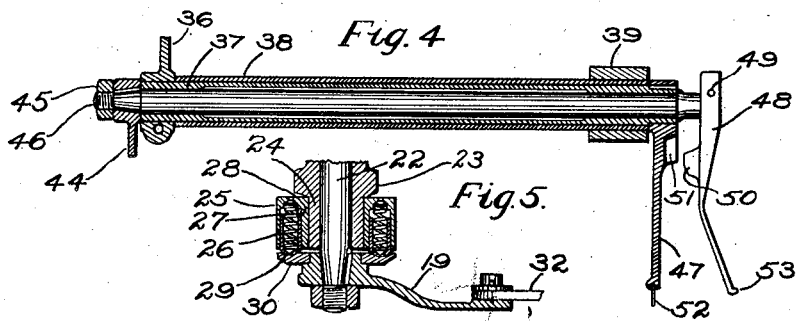

UNITED STATES PATENT OFFICE.

HENRY H. MERCER, OF CLAREMONT, NEW HAMPSHIRE, ASSIGNOR TO SULLIVAN MACHINERY COMPANY, A CORPORATION OF MASSACHUSETTS.

VALVE-CONTROLLING MECHANISM.

1,355,768.

Specification of Letters Patent. Patented Oct. 12, 1920.

Application filed February 23, 1916. Serial No. 80,034.

*To all whom it may concern:*

Be it known that I, HENRY H. MERCER, a citizen of the United States, residing at Claremont, in the county of Sullivan and State of New Hampshire, have invented certain new and useful Improvements in Valve-Controlling Mechanism, of which the following is a full, clear, and exact specification.

My invention relates to valve controlling mechanism.

It has for its object to enable an operator to control a valve in an improved manner. More specifically, my invention has for its object to provide improved means whereby an operator may singly or simultaneously adjust a plurality of valves from a relatively distant point. A further and more specific object of my invention is to provide improved adjustable means whereby an operator of a channeling machine, when located at any one of a plurality of distant points, may control any one or more of a plurality of exhaust controlling valves or sets of exhaust controlling valves, such as the upper and lower exhaust controlling valves for the piston cylinders, and thereby with greater facility regulate the cushioning effect of the exhaust at the ends of the piston travel.

In the accompanying drawings, I have, for purpose of illustration, illustrated one embodiment which my invention may assume in practice, the same being shown as applied to use in connection with a well known form of duplex channeler, although it is not limited to use in that connection.

In these drawings,—

Fig. 2 is a partial plan view of the motor head of the channeler, a portion of one cylinder head and a part of the frame being broken away to show one of the lower exhaust controlling valves, and the upper exhaust controlling mechanism being omitted to facilitate illustration.

Fig. 3 is a partial rear elevation of the channeler, showing the connections between a plurality of lower exhaust controlling valves.

Fig. 4 is a detail sectional view taken substantially on line 4—4 of Fig. 2, the operating means, however, being shown in a different position from that of Fig. 2, and one being shown in section and one in elevation.

Fig. 5 is a detail sectional view taken substantially on line 5—5 of Fig. 3, the lever 19, however, being shown in section throughout its entire length.

Fig. 6 is a partial plan view of the motor head of the channeler, showing the coöperating controlling mechanism for the upper exhaust controlling valves.

Fig. 7 is a partial rear elevation of the channeler, showing the mechanism shown in Fig. 6, a part of the cylinder being broken away to show the exhaust ports and the piston.

Fig. 8 is a detail view of a part of the adjusting mechanism for the upper exhaust controlling valves, the lever mechanism being removed to facilitate illustration.

Fig. 9 is a sectional view taken substantially on line 9—9 of Fig. 7, showing one of the upper exhaust controlling valves and the connections of the operating mechanism therefor.

Figure 1:
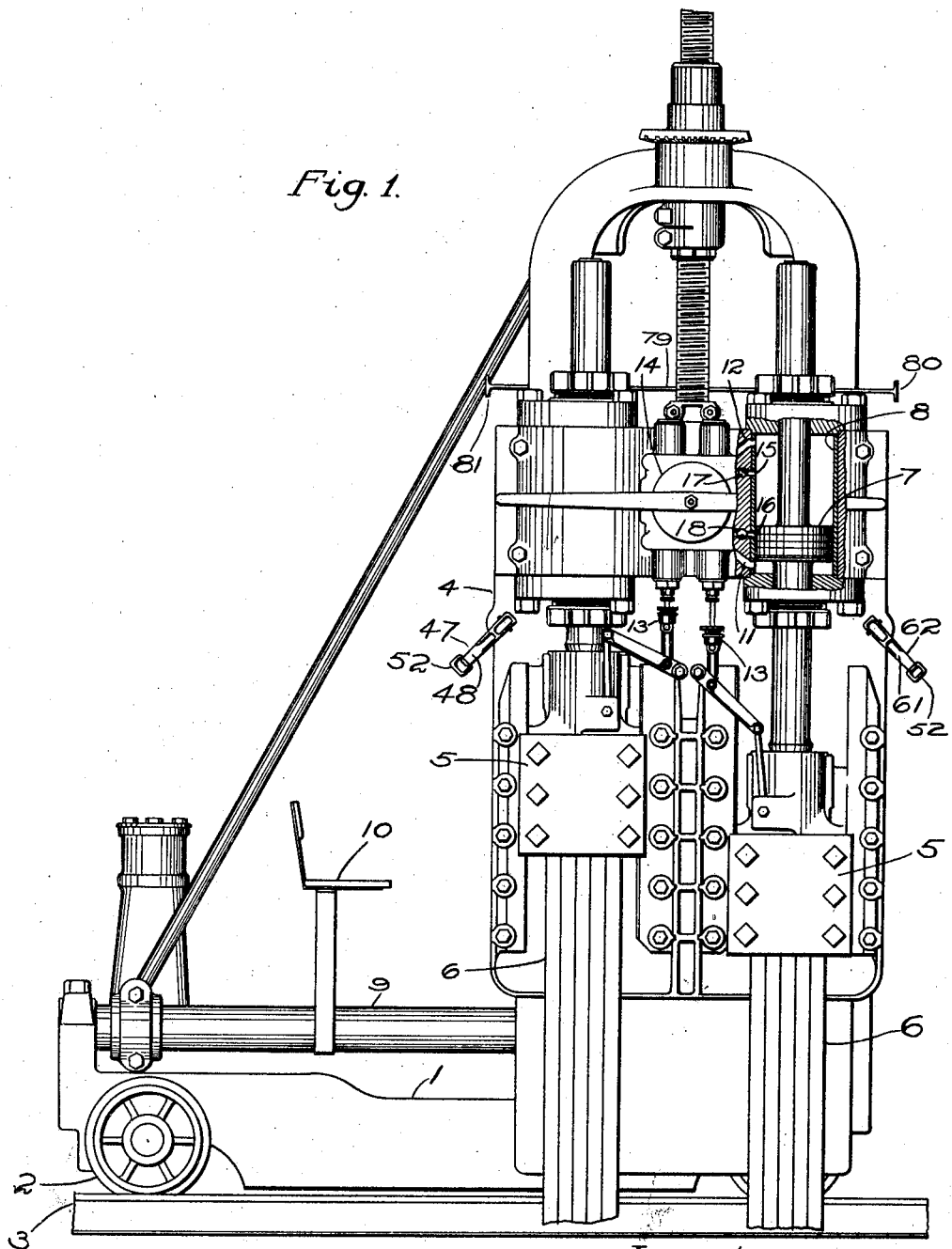
Figure 1 is a front elevation of such a channeler equipped with my improvement, one cylinder being broken away to show the exhaust ports and the controlling valves therefor, and the piston.

In the illustrative construction disclosed in these drawings, I have shown a duplex channeler of the general type described and claimed in the Mercer and Champagne Patent No. 1,131,256, granted March 9, 1915, comprising a truck 1 mounted upon wheels 2 and movable along a track 3, this truck 1 carrying a motor frame 4 in which cross-heads 5, carrying channeler gangs 6, are reciprocably mounted and movable, preferably in an out of step relation, by pistons 7 moving in cylinders 8, all in a well known manner. As usual, the motor frame 4 is mounted upon a horizontally disposed trunnion shaft or bar 9 carried by the truck 1, and is adjustable longitudinally of the member 9, so that it may assume a position at one end of the truck 1, as shown, or be adjusted to a position at the opposite end of the truck, an operator's seat 10, preferably carried on the member 9 or some other suitable part of the truck, being removed and re-attached to the unoccupied portion of the member 9, or truck. As the construction and operation of such duplex channelers is well known, it is unnecessary to the present purposes to go more into detail in describing the operation thereof than to say that as air or steam is admitted to the cylinders 8 of the chopping engine through ports 11 and 12, under the control of suitable valve mechanisms 13 operatively connected to the crossheads 5, and also under the control of the combination or distributing valve 14, the pistons 7 and gangs 6 are alternately operated, and the exhaust normally passes out of the cylinders through upper and lower exhaust ports 15 and 16 which are controlled by suitable upper and lower exhaust controlling valves 17 and 18, respectively.

In my improved construction, I have provided improved means whereby an operator posted at one side of the machine, as for instance when seated on the seat 10, may control either one or both of the lower exhaust controlling valves 18, so that as the work varies the desired cushioning effect may be maintained beneath the pistons 7, i. e. between the same and the lower ends of the cylinders. These means, in the embodiment of my invention herein illustrated, include a plurality of cranks 19 and 20 fixed by nuts 21 to the threaded rear ends of the elongated stems 22 on the valves 18, and rotatable with those stems, the latter being extended rearwardly through spools 23 (Fig. 2) a sufficient distance to permit the cranks and their connections, hereinafter described, to clear all obstructions on the back of the machine. As shown in Fig. 5, means are also provided to hold these cranks in each position of adjustment, an integral sleeve 24 being provided on the rear end of each of these spools 23, and having clamped thereto an outer split, sleeve-like member 25 in which is seated a plurality of plungers 26 having coiled springs 27 seated therein and acting between the plungers and a shoulder portion 28 on the sleeve 25, in such a manner as normally to project the plungers outward into suitable, radially arranged notches 29 formed in a flange-like member 30 there being one of these chambers fixed to and rotatable with each of the cranks 19 and 20.

When the several parts are in the position illustrated in Figs. 1, 2, 3, and 4, the crank 19 extends laterally to the right and slightly upward, while the crank 20 extends laterally to the left and slightly downward. As shown, the crank 19 is also pivotally connected by a suitable washer and pin connection 31 with a link 32, and this link is in turn adjustably connected through a slidable setscrew connection 33 with a coöperating member 34 pivoted at 35 to a substantially parallel crank 36 rotatable with a tubular member 37 which is journaled in an outer tubular member 38 (Fig. 4), carried at one side of the motor frame in a bracket 39 and disposed parallel to the valve 18, the member 37 being protruded forward to a point at the front of the machine. The crank 20, on the other hand, is adjustably connected through similar setscrew 40 and a member 41, pivoted to the crank, with a longer, transversely and downwardly extending link 42, which is in turn pivotally connected at 43 with a downwardly extending crank 44 fixed by means of a nut 45, to the threaded rear end of a rotary shaft 46, extending through the tubular member 37 to the front of the machine. It is thus seen that either or both of the valves 18 are operable from the operator's seat 10 by turning the front end or ends of either or both of the members 37—46. In order to enable these members to be so turned, a handle member 47 is fixed to the front end of the member 37, and a second handle member 48 is pivoted at 49 to the front end of the shaft 46, the arrangement being such that the handle 48 may be rotated and moved in a plane at right angles to its plane of rotation, toward or from the handle 47, which has only a rotary movement, so that an operator may rotate either handle when desired, or grasp both and thereupon adjust both valves 18 simultaneously, a tooth 50 preferably being provided on one of the members which is engagable with a serrated surface 51 on the other, to facilitate the turning movement, and a hook 52 preferably being provided on one of the members and engageable over a shoulder 53 on the other, to hold the members together when desired.

In my improved construction I have also provided improved means whereby either or both of the valves 18 may be adjusted by the operator when he is at either side of the machine as, for example, when the seat 10 is in either of its two positions as a result of the standard 4 being adjusted longitudinally along the trunnion bar 9. Obviously, however, these means also enable the device to be operated when the operator is standing in front of the machine or at either side thereof. These means include handle operated mechanism similar to that just described but located on the opposite side of the machine and connected to the valves 18 through supplementary connections. As shown, the crank 20 is, for this purpose, pivotally connected at 54 to a short, laterally and downwardly extending link 55, which is in turn pivotally connected to an upwardly extending crank 56 rotatable with a member (not shown) similar to the tubular member 37. The crank 36, on the other hand, is also provided with a pivoted member 57 at its upper end, which is adjustably attached through a setscrew 58 to a longer transversely extending link 59, and this link is in turn pivotally connected at its opposite end to a crank 60 extending in an opposite direction from the crank 56 and fixed to a member (not shown) similar to the rotary shaft 46. In this construction, as in that heretofore described as located upon the opposite side of the machine, a pair of similarly equipped operating handles is of course provided, the same being indicated at 61 and 62, it being understood that, as in the case of the connections between these operating handles and the cranks 56 and 60, this mechanism is in all respects a duplicate of the mechanism herein above described in detail as carried on the opposite side of the machine.

Coöperating with the means for controlling the lower exhaust controlling valves 18, just described, I have also provided means for controlling the upper exhaust controlling valves 17 whereby these valves may be adjusted relative to one another and simultaneously operated, and whereby an operator while in substantially the same position may adjust both these valves and the lower exhaust controlling valves. As shown, these means are connected to elongated threaded stems 63 on the valves 17, which extend outward at the rear of the machine, through threaded sleeved members 64, and include upstanding substantially parallel cranks 65 and 66, preferably formed of spring steel, and fixed by nuts 67 to the outer ends of these stems in such a manner that the valves turn with the cranks. As illustrated, these cranks 65 and 66 are pivotally connected at their upper ends to transversely disposed members 68 and 69, one of which is provided with a longitudinal slot 70, while the other is provided with a series of openings 71 adapted to receive an adjustable toothed bolt member 72 clamped in position thereon by a nut 73 and having a head engageable with the serrated face 74 of a plate 75, clamped on the back of the motor frame. Operatively connected to the member 72 at a point between the nut 73 and the member 68 and having a slotted connection with the member 72 to permit adjustment, is also a lever 76, pivoted at 77 on a bracket 78 on the top of the motor head, and having a transversely disposed operating rod 79, provided with handles 80 and 81 at its ends, pivotally connected thereto at its center at 82 so that an operator at either side of the motor may readily shift both upper valves simultaneously.

In the use of my improved construction, it will be noted that in either of the operator's positions, or when he is standing at one or the other side of the motor frame 4, he may readily operate one or both of the lower exhaust controlling valves 18 through the manipulation of one or both of the operating handles therefor; for instance if seated in the seat 10 when the latter is in the position shown, the operator may by a movement of the lever 47 adjust the lower exhaust controlling valve 18 of one cylinder so that the cushioning effect in the lower end of that cylinder is varied in accordance with the need of the work then being acted upon. He may also independently adjust the lever 48 and thereby vary the cushioning effect of the fluid in the lower end of the opposite cylinder by controlling the exhaust thereof. Furthermore, if he so desires, he may, by grasping the two handles 47 and 48, turn them both and thereby adjust both of the lower exhaust controlling valves 18, the tooth 50 on the member 48 then engaging the serrated face 51 on the member 47 and acting to move that member with the member 48. When the operator so desires, he may also, by manipulation of the clip 52, lock the two members together so that they will move as one and remain connected. It will of course be obvious that when the motor frame 4 is adjusted to the opposite end of the trunnion bar 9, and the seat 10 transposed, the operator will be able similarly to control the position of the lower exhaust controlling valves 18 from that location. So far as the operation of the upper exhaust controlling valves 17 is concerned, it will be noted that these likewise may also be operated when the operator is at either side of the machine, by simply operating the handles 80 and 81 of the rod 79, the operator thus being able to change the cushioning effect of the exhaust in either or both the upper and lower ends of both cylinders from substantially a single position.

In the operation of the mechanism, it will of course also be evident that through the provision of the spring pressed plungers 26, each lower exhaust controlling valve 18 will be held in its adjusted position whatever that position may be, and that through the provision of the toothed member 72 and the serrated face 74 on the plate 75, the upper exhaust controlling valves 17 will also be held in their positions of adjustment, the spring cranks 65 and 66 yielding to permit any adjustment desired, and always holding the parts under tension. Attention should also be directed to the fact that by the provision of the adjustable setscrews 33, 40, and 58, in the lower exhaust controlling valve connections, and the adjustable slot and bolt connections in the upper exhaust controlling valve mechanism, the relation of any one of the valves relative to its fellow in either of these sets may be varied as desired, and the parts then clamped together for simultaneous operation. In connection with the setscrews 33, 40, and 58, mentioned, it should also be noted that by the provision of the same and the clips 52 for attaching together the handles 47, 48, and 61, 62, it is possible to bring the valves 18 into such relation that their action is balanced, the clips 52 being first placed in position in making such an adjustment, the several setscrews then being released and the valves then adjusted, whereupon the setscrews may again be tightened.

While I have in this application specifically described one embodiment which my invention may assume in practice, it is, of course, to be understood that this form of the same is used for purposes of illustration, and that the invention is not limited thereto and may be modified and embodied in various other forms and applied to other valves and other exhaust valves, without departing from its spirit, it being my intention to include all such modifications within the scope of the appended claims.

What I claim as new and desire to secure by Letters Patent is:—

1. In a valve controlling mechanism, a plurality of valves, and controlling means therefor comprising a plurality of selective operating means therefor disposed at different points and each comprising a plurality of controlling members having means for connection for joint operation and each operatively connected to a different valve.

2. In a valve controlling mechanism, a plurality of valves, and controlling means therefor comprising a plurality of selective operating means therefor disposed at different points and each comprising a plurality of simultaneously operable controlling members having means for connection for joint operation and connected to different valves.

3. In a valve controlling mechanism, a plurality of valves, means for operating said valves having means for connection for simultaneous operation from a distant point, and means operatively connected to said first mentioned means for operating said valves and having means for connection for simultaneous movement from another distant point.

4. In a valve controlling mechanism, a plurality of valves, means for operating any one or all of said valves from a distant point, and means connected between said last mentioned means and the valves for operating any one or all of said valves from another distant point, certain of said means being provided with means for connection for joint operation.

5. In combination, a motor having a piston and a cylinder, a valve controlling the exhaust from said cylinder and normally operable from the rear of said motor, and supplemental valve operating means connected to said valve and operable from either side of the front of said motor.

6. In combination, a motor having a piston and a cylinder, a valve controlling the exhaust from said cylinder and normally operable from the rear of said motor, and valve controlling means connected to said valve and extending to the front of said motor at either side thereof.

7. In combination, a motor having a plurality of cylinders and pistons in said cylinders, a plurality of valves controlling the exhaust from said cylinders, and means connected to said valves and extending to either side of the front of said motor for operating the same.

8. In combinatiotn, a motor having a plurality of cylinders and pistons in said cylinders, a plurality of valves controlling the exhaust from said cylinders, and means connected to said valves and extending at either side of said motor to the front thereof for operating any one or more of said valves.

9. In combination, a motor, a plurality of valves constituting a part of the valve gear thereof, a plurality of rotatable operating members disposed at different sides of said motor respectively, and an operating connection between each of said rotatable members and one of said valves.

10. In combination, a motor, a plurality of valves constituting a part of the valve gear thereof, a plurality of independently rotatable operating members disposed at each side of said motor, and a connection between each of said operating members and one of said valves.

11. In combination, a motor, a plurality of valves constituting a part of the valve gear thereof, a plurality of rotatable operating members provided with means for connection for simultaneous operation and disposed at each side of said motor, and a connection between each of said rotatable members and one of said valves.

12. In combination, a motor, a plurality of valves constituting a part of the valve gear thereof, a plurality of rotatable operating members disposed at each side of said motor, said members being operable independently and also having means for connection for simultaneous operation, and a connection between each of said rotatable members and one of said valves.

13. In combination, a motor, a plurality of valves therefor, cranks connected to said valves, links connected to said cranks, coöperating cranks operatively connected to said links, and an operating member connected to each of said last mentioned cranks and disposed at either side of said motor.

14. In combination, a motor, a plurality of valves therefor, an operating member journaled on said motor, a coaxially disposed operating member journaled on said motor, connections between said operating members and said valves, a handle member fixed to one of said operating members, and a handle member pivoted to the other operating member and movable toward or from said first mentioned handle.

15. In combination, a motor, a plurality of valves therefor, an operating member journaled on said motor, a coaxially disposed operating member journaled on said motor, connections between said operating members and said valves, a handle member fixed to one of said operating members, a handle member pivoted to the other operating member and movable toward or from said first mentioned handle, and interlocking means disposed between said handles.

16. In combination, a motor, a plurality of valves therefor, an operating member journaled on said motor, a coaxially disposed operating member journaled on said motor, connections between said operating members and said valves, a handle member fixed to one of said operating members, a handle member pivoted to the other operating member and movable toward or from said first mentioned handle, and means for attaching said handles together.

17. In combination, a motor, a plurality of valves therefor, a rotatable member journaled at each side of said motor, a coaxially disposed rotatable member journaled at each side of said motor, operative connections between said rotatable members and said valves, a handle member fixed to each of said first mentioned rotatable members, and a handle member pivoted to each of said last mentioned rotatable members.

18. In combination, a motor, a valve therefor having a stem extending therefrom, a recessed sleeve member, spring pressed plungers carried in the recesses in said last mentioned sleeve, and a member rotatable with said stem having a plunger-receiving recess therein.

19. In combination, a motor having a plurality of cylinders each provided with exhaust ports at its opposite ends, exhaust controlling valves therefor, means extending to one side of said motor for simultaneously operating one of said sets of exhaust controlling valves, and similar means operable from the same station for simultaneously operating the other set of exhaust controlling valves.

20. In combination, a motor, a plurality of valves forming a part of said motor, cranks connected to said valves, adjustable connections between said cranks, and means attached to said adjustable connections for simultaneously operating both of said cranks and valves.

21. In combination, a motor, a plurality of valves therefor, cranks connected to said valves, an adjustable connection between said cranks, a lever pivoted on said motor and pivotally connected to said adjustable connection, and means for swinging said lever about its pivot from either side of said motor.

22. In combination, a motor, a plurality of valves therefor, cranks connected to said valves, an adjustable connection between said cranks, a lever pivoted on said motor and pivotally connected to said adjustable connection, means for swinging said lever about its pivot from either side of said motor, and means for retaining said lever in each position of adjustment thereof.

23. In a valve controlling mechanism, a plurality of valves, a plurality of controlling mechanisms therefor, and detachable means for connecting said controlling mechanisms to render the latter operative simultaneously.

24. In a valve controlling mechanism, a plurality of valves, a plurality of normally disconnected controlling mechanisms therefor, and detachable means for connecting said controlling mechanisms to render the latter operative simultaneously.

In testimony whereof I affix my signature.

HENRY H. MERCER.